(No Model.)
C. H. DORAN.
SECTIONAL HORSESHOE.
No. 480,563. Patented Aug. 9, 1892.
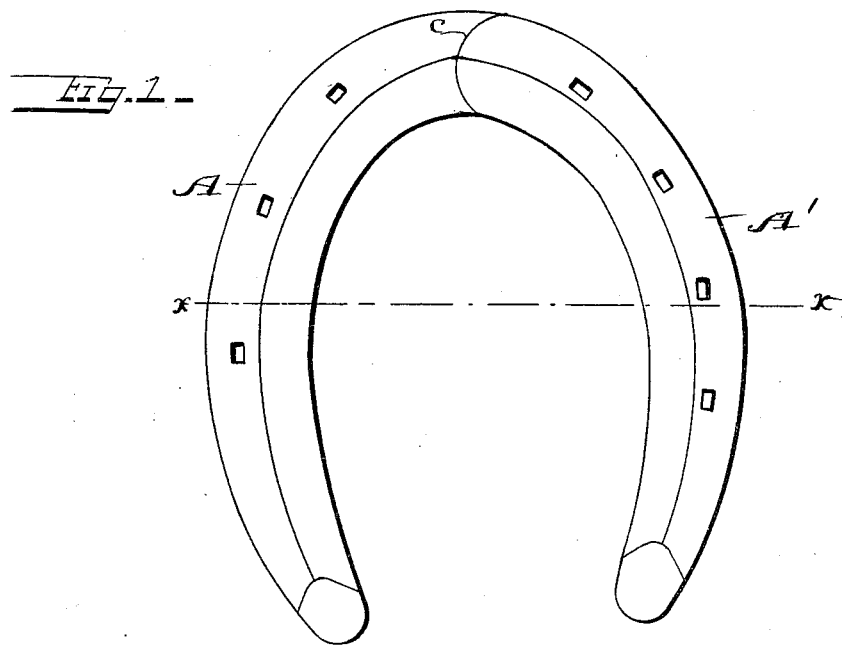
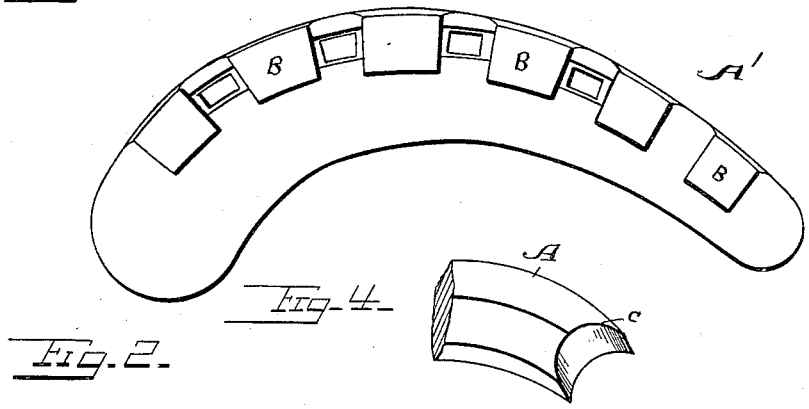
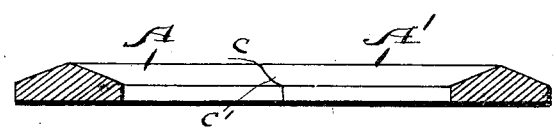
Witnesses
Jesse Hell
Philip Lucasi
Inventor
Charles H. Doran,
by E. W. Anderson
his Attorney

UNITED STATES PATENT OFFICE.

CHARLES H. DORAN, OF OLEAN, NEW YORK.

SECTIONAL HORSESHOE.

SPECIFICATION forming part of Letters Patent No. 480,563, dated August 9, 1892.

Application filed March 31, 1892. Serial No. 427,238. (No model.)

*To all whom it may concern:*

Be it known that I, CHARLES H. DORAN, a citizen of the United States, and a resident of Olean, in the county of Cattaraugus and State of New York, have invented certain new and useful Improvements in Horseshoes; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 is a plan view of the ground side of the shoe. Fig. 2 is a sectional view on the line $x\,x$ of Fig. 1, looking toward the toe. Fig. 3 is a plan view, ground side, of one of the sections, and Fig. 4 is a perspective view of a portion of one of the sections, showing calk projections.

This invention has relation to certain new and useful improvements in horseshoes, the object being to provide a shoe adapted for ordinary use and especially designed for colts having growing hoofs and for horses affected with contracted hoofs, the shoe being so constructed as to permit the growth and expansion of the hoof, and consequently to cure the contraction and prevent the malformation and cracking common in such cases when the ordinary shoe is employed; and the invention consists in the novel construction and combination of parts hereinafter specified.

The invention more particularly consists in a shoe formed in two independent sections, abutting closely against each other and forming a continuous shoe, rigid for the purposes where rigidity is necessary, but capable of a radial movement to allow the shoe a greater or less transverse spread under the movement of the hoof.

In the accompanying drawings, the letters A A' designate the two sections of the shoe, which in Fig. 1 is shown as of plate form or without calks. Said sections comprise each one-half of the shoe and are brought together at the toe portions. One of the sections A at its forward end is cut out or recessed to form an arcuate recess $c$, the wall $c'$ of which is inclined from the upper to the lower edge. The other section A' at its forward end is of arcuate-convex form and beveled on its face reversely to the incline of the wall $c'$. The sections are secured to the hoof each in the usual rigid manner, their ends fitting together in the manner shown, forming a continuous shoe, rigid so far as the normal condition of the hoof is concerned; but under growth or expansion of the hoof said sections are capable of a radial movement, which allows them to adapt themselves to the varying spread of the hoof without destroying the continuity of the shoe or the wearing-surface thereof. In Fig. 3 I have shown the same construction applied to a section of a shoe having calks B.

The use of this shoe will obviate the cutting practiced in cases of contracted hoofs, together with the springs and other devices sometimes employed for opening or spreading the hoof.

I am aware that horseshoes have heretofore been formed in a plurality of sections having an articulated or hinged connection, and I disclaim such; but, Having described this invention, what I claim as new, and desire to secure by Letters Patent, is—

1. A horseshoe formed in two independent sections, the toe end of one section having an arcuate convexity therein and the corresponding end of the other section having an arcuate concavity fitting said convexity, the meeting faces of said sections being also oppositely beveled or inclined, the said sections being free to move upon one another at their point of engagement, substantially as specified.

2. A horseshoe comprising two sections A A', the toe end of one of the sections having an arcuate concavity $c$, the wall of which is inclined from top to bottom, the opposing section terminating at its toe end in an arcuate convexity of the same radius as the concavity, but reversely inclined on its face, said sections being free to move upon one another at their point of engagement, substantially as specified.

In testimony whereof I affix my signature in presence of two witnesses.

CHARLES H. DORAN.

Witnesses:
FRANK CHESBRO,
FRANK W. ABRAMS.